(12) United States Patent
Boxall et al.

(10) Patent No.: US 9,547,483 B1
(45) Date of Patent: Jan. 17, 2017

(54) FEEDBACK DIRECTED OPTIMIZED COMPILING OF OPTIMIZED EXECUTABLE CODE

(71) Applicant: International Business Machines Corporation, Armonk, NY (US)

(72) Inventors: Alan S. Boxall, Markham (CA); Steven Cooper, Ontario (CA); Allan H. Kielstra, Ontario (CA); Trong Truong, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/934,457

(22) Filed: Nov. 6, 2015

(51) Int. Cl.
*G06F 9/45* (2006.01)

(52) U.S. Cl.
CPC .................................. *G06F 8/41* (2013.01)

(58) Field of Classification Search
None
See application file for complete search history.

(56) References Cited

U.S. PATENT DOCUMENTS

| | | | | |
|---|---|---|---|---|
| 5,544,311 A * | 8/1996 | Harenberg | .......... | G06F 11/2236 714/30 |
| 5,995,754 A * | 11/1999 | Holzle | .................. | G06F 9/4552 717/158 |
| 6,014,513 A * | 1/2000 | Voelker | ..................... | G06F 8/75 717/131 |
| 6,298,477 B1 * | 10/2001 | Kessler | ............... | G06F 9/45504 712/222 |
| 6,530,075 B1 * | 3/2003 | Beadle | ................ | G06F 9/45516 717/114 |
| 6,993,755 B1 * | 1/2006 | Ungar | ................. | G06F 9/45516 717/158 |
| 7,117,318 B1 * | 10/2006 | Tene | ................... | G06F 12/0253 711/100 |
| 7,251,810 B1 | 7/2007 | Nolte | | |
| 7,257,685 B2 * | 8/2007 | Tene | ................... | G06F 12/0253 711/100 |
| 8,291,399 B2 | 10/2012 | Li et al. | | |
| 8,453,132 B2 * | 5/2013 | Mannarswamy | ..... | G06F 8/4442 717/114 |
| 8,756,584 B2 | 6/2014 | Zhou | | |
| 2002/0144241 A1 * | 10/2002 | Lueh | ................... | G06F 9/45516 717/136 |
| 2003/0023856 A1 * | 1/2003 | Horne | ................. | G06F 11/3624 713/187 |

(Continued)

*Primary Examiner* — Adam Lee
(74) *Attorney, Agent, or Firm* — Garg Law Firm, PLLC; Rakesh Garg; Issac Gooshaw

(57) ABSTRACT

For optimizing executable code, during a first compilation of a source code, a set of signatures is inserted in a first executable code. A signature in the set of signatures includes a combination of executable instructions. During an execution of the first executable in a debugger an instruction to call a counter code is executed from a location of the signature to increment a counter corresponding to the signature. A value of the counter is provided to a compiler to correspond with the location of the signature in the first executable code. The source code is recompiled into a second executable code, optimizing a portion of the second executable code responsive to the value exceeding a threshold. The portion is related to the location of the signature in the first executable code.

20 Claims, 5 Drawing Sheets

(56) References Cited

U.S. PATENT DOCUMENTS

| | | | | |
|---|---|---|---|---|
| 2003/0154464 A1* | 8/2003 | Ullmann | G06F 9/4425 | 717/130 |
| 2004/0003384 A1* | 1/2004 | Pechtchanski | G06F 11/3466 | 717/158 |
| 2004/0078560 A1* | 4/2004 | Adl-Tabatabai | G06F 9/30181 | 712/244 |
| 2004/0172544 A1* | 9/2004 | Luo | G06F 21/125 | 713/189 |
| 2005/0044538 A1* | 2/2005 | Mantripragada | G06F 8/443 | 717/151 |
| 2005/0071826 A1* | 3/2005 | Nistler | G06F 8/4443 | 717/145 |
| 2005/0183072 A1* | 8/2005 | Horning | G06F 21/14 | 717/140 |
| 2006/0026430 A1* | 2/2006 | Luo | G06F 21/16 | 713/176 |
| 2006/0048114 A1* | 3/2006 | Schmidt | G06F 9/45516 | 717/148 |
| 2006/0259750 A1* | 11/2006 | Swoboda | G06F 9/30003 | 712/227 |
| 2007/0050682 A1* | 3/2007 | Takuma | G06F 11/3652 | 714/45 |
| 2007/0150880 A1* | 6/2007 | Mitran | G06F 8/441 | 717/161 |
| 2007/0245324 A1* | 10/2007 | Inglis | G06F 8/443 | 717/140 |
| 2008/0028179 A1* | 1/2008 | Mannarswamy | G06F 8/4442 | 711/173 |
| 2008/0028474 A1* | 1/2008 | Horne | G06F 21/16 | 726/27 |
| 2008/0066056 A1* | 3/2008 | Inoue | G06F 11/3644 | 717/124 |
| 2008/0263340 A1* | 10/2008 | Weiberle | G06F 9/30181 | 712/229 |
| 2008/0270660 A1* | 10/2008 | Weiberle | G06F 9/30076 | 710/261 |
| 2009/0113403 A1* | 4/2009 | Davis | G06F 8/443 | 717/146 |
| 2009/0249317 A1* | 10/2009 | Hui | G06F 9/45516 | 717/148 |
| 2009/0320003 A1* | 12/2009 | Barsness | G06F 8/443 | 717/146 |
| 2010/0037033 A1* | 2/2010 | Karecha | G06F 21/552 | 711/217 |
| 2010/0095376 A1* | 4/2010 | Rodriguez | G06F 21/16 | 726/22 |
| 2010/0199265 A1 | 8/2010 | Maybee | | |
| 2011/0320766 A1* | 12/2011 | Wu | G06F 9/30076 | 712/28 |
| 2012/0054726 A1* | 3/2012 | Doing | G06F 11/3466 | 717/158 |
| 2012/0144165 A1* | 6/2012 | Bybell | G06F 9/30181 | 712/208 |
| 2012/0185714 A1* | 7/2012 | Chung | G06F 1/3203 | 713/323 |
| 2013/0019231 A1* | 1/2013 | Mangard | G06F 8/43 | 717/151 |
| 2014/0068569 A1 | 3/2014 | Goldin et al. | | |
| 2014/0075158 A1* | 3/2014 | Indukuru | G06F 9/3834 | 712/216 |
| 2014/0101643 A1* | 4/2014 | Inoue | G06F 8/4441 | 717/156 |
| 2014/0298307 A1 | 10/2014 | Johnson et al. | | |
| 2014/0380289 A1* | 12/2014 | Kalogeropulos | G06F 8/443 | 717/152 |
| 2015/0169304 A1* | 6/2015 | Angerer | G06F 8/433 | 717/154 |
| 2015/0331681 A1* | 11/2015 | Rose | G06F 8/437 | 717/143 |
| 2016/0062878 A1* | 3/2016 | Westrelin | G06F 11/3688 | 717/130 |

* cited by examiner

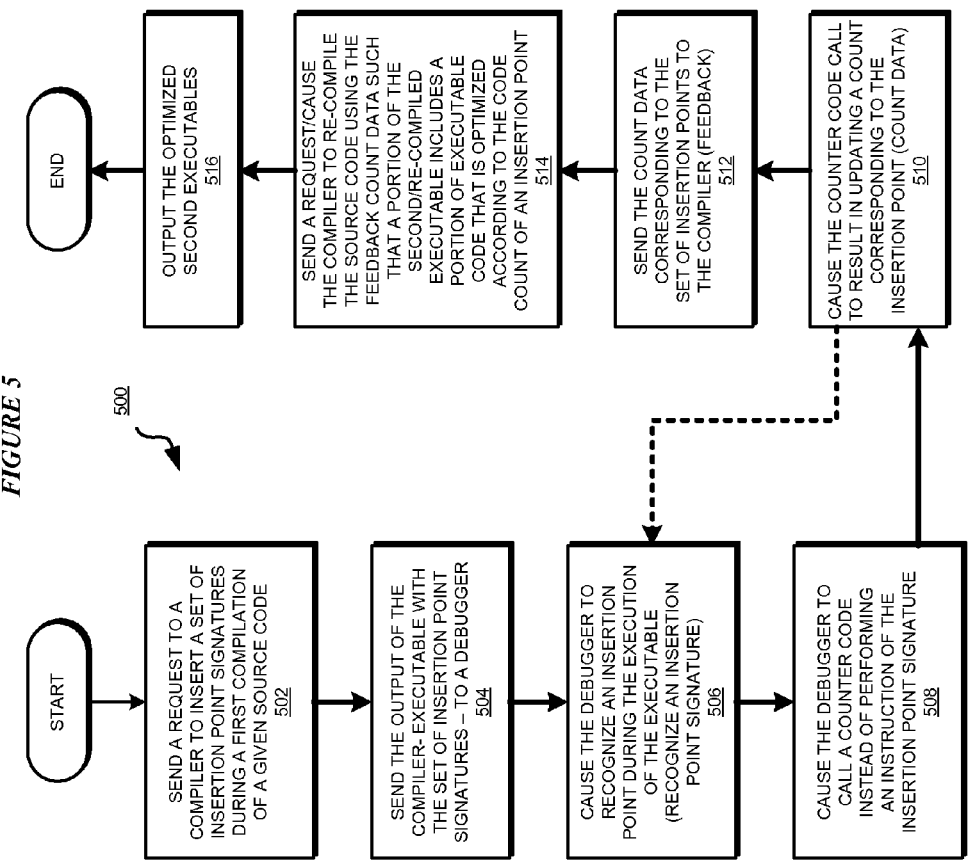

FEEDBACK DIRECTED OPTIMIZED COMPILING OF OPTIMIZED EXECUTABLE CODE

TECHNICAL FIELD

The present invention relates generally to a method, system, and computer program product for compiling source code. More particularly, the present invention relates to a method, system, and computer program product for feedback directed compiling of optimized executable code.

BACKGROUND

A compiler accepts as input a source code in a high-level programming language or some other equivalent high level semantic representation of a computer program. The compiler converts or "compiles" the source code into machine language code, i.e., binary code in ones and zeros, which is executable on a data processing system or machine. The machine language code produced from a compiler is also called an executable code, or simply an executable. Many compilers are presently available for compiling source code written in a variety of programming languages.

Debugging is the process of determining a cause of an undesirable operation of an executable. Some examples of an undesirable operation include, but are not limited to, an error during the execution of the executable, an error caused elsewhere in the machine as a result of the execution, a malfunction of a system, incorrect manipulation of data, an incorrect or faulty operation of the executable, an undesirable rate or speed of performance of the machine or the executable during the execution, an undesirable output or a lack of an output during the execution, an adverse effect of the execution, and the like.

A debugger is a software tool, which controls and examines an execution of an executable, to assist in locating an operation in the executable, which may be contributing to the undesirable operation. Many debuggers are presently available for this purpose.

A profile of a code, such as of a portion of a source code or a portion of an executable code, includes a frequency of use of the code during the execution of an executable corresponding to the code. In other words, the higher a number of times a portion is called, used, or executed during the execution, the higher the profile of the portion. Many profilers are presently available for this purpose. The number of times a portion of code is called, used, or executed during an execution of the code is interchangeably referred to herein as a "count" or a "frequency".

SUMMARY

An embodiment includes a method that inserts, during a first compilation of a source code, a set of signatures in a first executable code, where a signature in the set of signatures includes a combination of executable instructions. The embodiment executes, during an execution of the first executable in a debugger using a processor and a memory, an instruction to call a counter code. The embodiment increments, responsive to the executing, a counter corresponding to the signature, where the counter code is configured to increment the counter in response to the instruction to call the counter code being executed from a location of the signature in the first executable code. The embodiment provides to a compiler, a value of the counter corresponding to the location of the signature in the first executable code. The embodiment recompiles the source code to form a second executable code, the recompiling optimizing a portion of the second executable code responsive to the value exceeding a threshold, where the portion is related to the location of the signature in the first executable code.

Another embodiment includes a computer program product. The computer program product includes one or more computer-readable storage devices, and program instructions stored on at least one of the one or more storage devices.

Another embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a flowchart of an example process for feedback directed compiling of optimized executable code in accordance with an illustrative embodiment.

DETAILED DESCRIPTION

Figure 1:
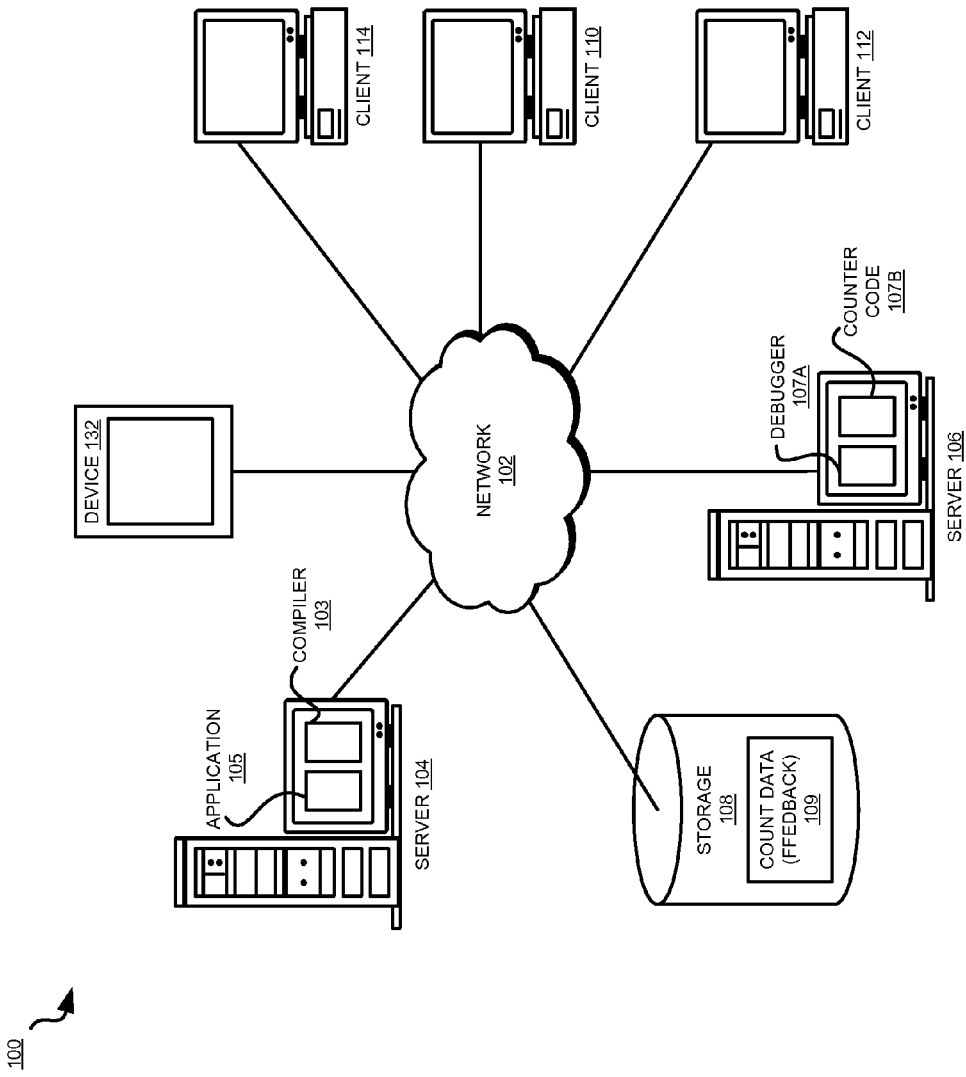
FIG. 1 depicts a block diagram of a network of data processing systems in which illustrative embodiments may be implemented.

Different portions of a given source code can have different profiles. For example, one portion may be regarded as "hot" for having a frequency that exceeds a threshold, whereas another portion may be regarded as "cold" for having a frequency that is below the threshold. As another example, hot and cold may be relative to one another and not relative to a fixed threshold, e.g., one portion may be hot as compared to another portion, or one portion may be cold as compared to another portion. As another example, hot and cold may be relative to different executions and not relative to a fixed threshold, e.g., one portion may be hot as compared to a frequency of the portion in a previous execution, or one portion may be cold as compared to as compared to a frequency of the portion in a previous execution.

It is desirable that the executable of a source code be optimized for execution. Particularly, it is desirable that a portion of the executable that corresponds to a hot section of a given source code be configured in such a manner as to execute with a greater than a threshold efficiency, e.g., by using less than a threshold amount of computing resources, by being capable of uninterrupted execution, by having a higher than a threshold priority during execution, or some combination thereof.

Presently, executable optimization follows one of two known methods. According to one presently used method, a user marks or points out certain user-selected portions of a given source code to a compiler. The compiler then regards these marked portions as hot, and creates optimized executable instructions corresponding to the marked portions when creating the executable of the source code.

According to another method, given a source code, a compiler self-determines, according to logic built into the compiler, certain portions of the source code to be hot. The compiler then creates optimized executable instructions corresponding to the self-determined portions when creating the executable of the source code.

Even if, presently, compilation or recompilation can be done using profile information, the profile information has to be separately collected and added to the compilation or recompilation process. Presently, a compiler cannot itself identify hot sections, and facilitate a debugging tool to gather the frequency information, as described herein.

The illustrative embodiments recognize that presently available methods of optimizing executable code have certain disadvantages. For example, using a presently available method for optimizing executable code, it is possible that a section of the source code whose corresponding executable code is actually hot may not be intuited or selected for optimization. Conversely, it is also possible that a section of the source code whose corresponding executable code is not actually hot may be intuited or selected for optimization. In either case, any benefit that can be derived from the optimization remains largely unrealized during the execution of the executable code.

The illustrative embodiments used to describe the invention generally address and solve the above-described problems and other problems related to optimized compiling of source code. The illustrative embodiments provide a method, system, and computer program product for feedback directed compiling of optimized executable code.

An embodiment can be implemented as a software application. The application implementing an embodiment can be configured as a modification of an existing debugger, as a separate application that operates in conjunction with an existing debugger, a modification of an existing compiler, as a separate application that operates in conjunction with an existing compiler, or some combination thereof.

An embodiment instructs, commands, or requests, an existing compiler, such as through a modification of the compiler according to an embodiment, to mark a set of insertion points in an executable code of a source code. As described in this disclosure, presently available compilers are able to self-determine hot sections of the source code. Pursuant to the request from the embodiment, and for each self-determined hot section, the compiler further identifies a point in or near the executable code corresponding to the self-determined hot section.

Such a point is referred to herein as an insertion point. An insertion point can occur within the instructions of the executable code of a hot section, within a pre-determined number of instructions before the executable code of the hot section, within a pre-determined number of instructions after the executable code of the hot section, or some combination thereof. Thus, for a set of self-determined hot sections, the compiler determines a corresponding set of insertion points.

Further pursuant to the request from the embodiment, the compiler inserts an insertion point signature at each insertion point. An insertion point signature is a combination of executable instructions in an executable code, which when examined by a debugger, informs the debugger that the signature has been inserted by the compiler to mark an insertion point and is not a result of converting the source code to executable code.

As an example, consider a no-op instruction that is commonly found in executable code. A compiler can create a no-op instruction in an executable code as a result of compiling source code. However, except in certain limited circumstances such as to align loops, a compiler usually does not create consecutive no-op instructions in the executable code as a result of the compilation. In other words, it is unlikely that a compiler would create three consecutive no-op instructions, and highly unlikely that a compiler would create more than three consecutive no-op instructions, in the executable code as a result of simply compiling the executable code.

Along the same reasoning, it is even more unlikely that the compiler would create four, five, or more consecutive no-op instructions in the executable code as a result of simply compiling the executable code. Thus, a sequence of n consecutive no-op instructions in the executable code can be safely regarded as an indication that something other than the compilation process caused the insertion of those no-op instructions in the executable code. Generally, any sequence of operations that can be regarded as such an indication as long as the compiler and the debugger are both configured to regard such sequence as such an indication.

An embodiment causes the compiler to use a sequence of n consecutive no-op instructions as an insertion point signature. Because no-op instructions literally mean no operation, they are computationally negligible in cost and have an ignorable adverse effect on the performance of the executable code. Therefore, inserting a series of no-ops as a signature or marker of an insertion point alters the execution properties of the executable in only an insignificant way. For example, if the executable with the no-ops has to be executed outside a debugger, even the insignificant effect can be reduced by a branch around the no-ops.

In one embodiment, all insertion point signatures are formed using the same number of no-ops in a sequence. In another embodiment, different insertion point signatures use different numbers of no-ops in their respective sequences. As a non-limiting example, different numbers of no-ops can be used to indicate different meanings—that are mutually agreed between the compiler and the debugger—relative to the various portions in the executable code, or for other purposes.

The executable that includes the insertion point signatures is referred to herein as a first executable. An embodiment sends the first executable to a debugger. An embodiment further makes a counter code available to the debugger. A counter code is any suitable code that can be called from the debugger to count a number of times the counter code has been called or invoked from an insertion point in an executable code.

In one embodiment, the counter code counts all calls similarly. In another embodiment, the counter code performs count accounting differently for different calls. For example, the counter code can be configured to perform a computationally insignificant counting operation for call numbers 1-9 and perform a computationally more expensive count accounting for every tenth call.

These examples of counting and counter code are not intended to be limiting. From this disclosure, those of ordinary skill in the art will be able to conceive many other manners of counting and counter codes to implement therefor, and the same are contemplated within the scope of the illustrative embodiments.

An embodiment instructs, commands, or requests the debugger, such as through a modification of the debugger according to an embodiment, to replace one or more no-op instruction from an insertion point signature at an insertion point with a call to the counter code. In one embodiment, a call to the counter code replaces a single no-op instruction in a signature. In another embodiment, a call to the counter code replaces multiple no-op instructions in the signature. An insertion point signature is constructed in such a manner that a sequence of no-ops used in the signature is at least equal to the number of no-op instructions that have to be used to replace with the call to the counter code.

In this manner, when the no-ops are replaced in the signature, the relative positioning of other instructions in the executable code remains unchanged. In other words, such a replacement causes the memory address offsets of a signature and other instructions before or after the signature to remain unchanged.

The debugger executes the first executable. When the execution in the debugger comes to an insertion point, the debugger recognizes the insertion point from the insertion point signature. The debugger replaces one or more no-ops in the signature with instructions to call the counter code.

Note that the replacement of a no-op with an instruction to call the counter code need not actually replace any instruction in the executable. Rather, in response to the debugger recognizing the insertion point, the debugger simply executes the instructions to call the counter code instead of executing an equivalent number of no-ops from the signature.

The counter code maintains a counter for each insertion point. In response to the debugger calling the counter code, the counter code increments a counter associated with the insertion point. In other words, the counter tracks how many times the counter code has been invoked from the location of the insertion point in the executable. In one embodiment, for associating a counter with an insertion point, the insertion point is identified by a memory address offset of a no-op in the insertion point's signature. For example, if an example address range of the instructions of the executable begins at 0xA000, and if a no-op of a signature appears at 0xA650, the offset of the no-op is said to be 0xA650 and the counter code associates a counter with the insertion point identified by the offset 0xA650.

Operating in this manner, the execution of the executable in the debugger collects count data in a set of counters associated with the set of insertion points. Each counter contains a number of times the counter code was called from the corresponding insertion point in the executable.

An embodiment provides the count data as feedback to the compiler, such as via a modification of the compiler according to an embodiment. The feedback provides the compiler an actual count at the various insertion points, thereby enabling the compiler to determine whether the portion of the executable code—and by inference the portion of the source code—associated with a particular insertion point was actually a hot portion. The compiler makes this determination by evaluating whether the count at the insertion point exceeds a threshold count, making the portion a hot portion.

An embodiment causes the compiler to re-compile the source code using the feedback. Now, because the compiler has the information about actual hot portions from the counts, the compiler optimizes only the portions that correspond to the insertion points whose counts exceeded the threshold. Alternatively, the compiler more aggressively optimizes those portions that correspond to the insertion points whose counts exceeded the threshold as compared to other portions. The recompiled executable is referred to herein as a second executable. In one embodiment, the compiler omits inserting insertion point signatures in the second executable.

Thus, according to the illustrative embodiments, the second executable is now optimized according to an actual determination of hot portions from an actual execution. Furthermore, the optimization occurs without artificially altering a performance of the first executable or changing the hot portions of the first executable, and the second executable predictably executes in the same manner as the first executable, only with better optimization and performance of the actual hot portions in the second executable.

A method of an embodiment described herein, when implemented to execute on a device or data processing system, comprises substantial advancement of the functionality of that device or data processing system in optimizing executable code. For example, a presently available method of optimization requires a user or the compiler to guess which portions of the source code are likely to be hot. An embodiment systematically identifies the portions of an executable to be hot or cold under an actual execution where a debugger collects the frequency information for the compiler-identified portions. An embodiment recompiles the source code such that the second executable is optimized according to an actual count of the use of the various portions of the executable as collected using a debugger. This manner of feedback directed compiling of optimized executable code is unavailable in presently available methods. Thus, a substantial advancement of such devices or data processing systems by executing a method of an embodiment is in optimizing the known hot portions of an executable, avoiding optimizing cold portions of the executable, or both.

The illustrative embodiments are described with respect to certain source code, executable code, portions, thresholds, hot or cold determinations, insertion points, insertion point signatures, instructions, counter code, counters, count data, feedback, recompilation, compiler, debugger, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
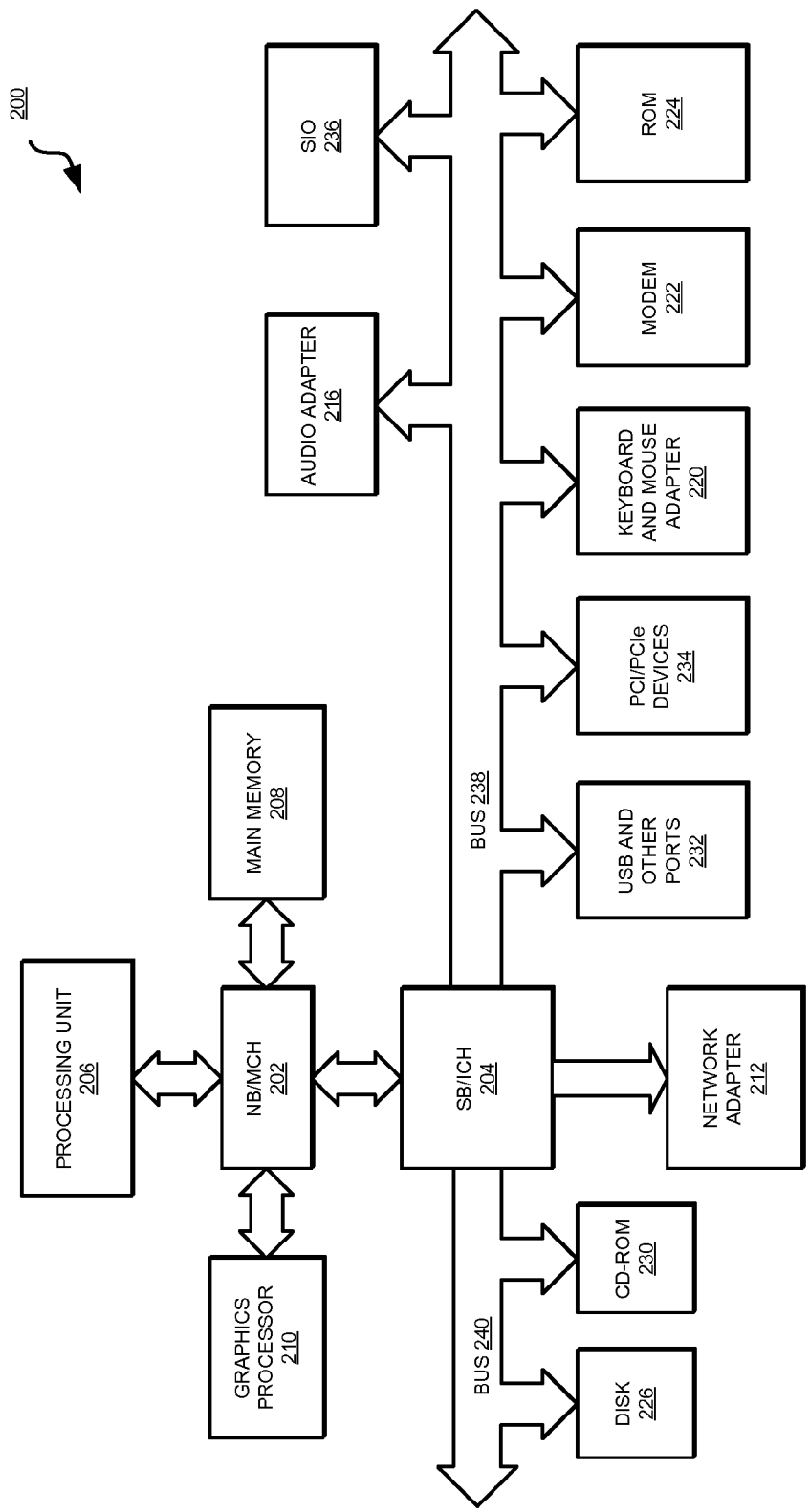
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Compiler 103 is an existing compiler that has been modified or otherwise enabled according to an embodiment to operate with application 105 in a manner described herein. Debugger 107A is an existing debugging tool that has been modified or otherwise enabled according to an embodiment to operate with application 105 in a manner described herein. Counter code 107B is constructed in any suitable manner to operate in a manner described herein. Debugger 107A operates on an executable (not shown) to create count data 109 in a manner described herein. Compiler 103 uses count data 109 to create an optimized executable (not shown) in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
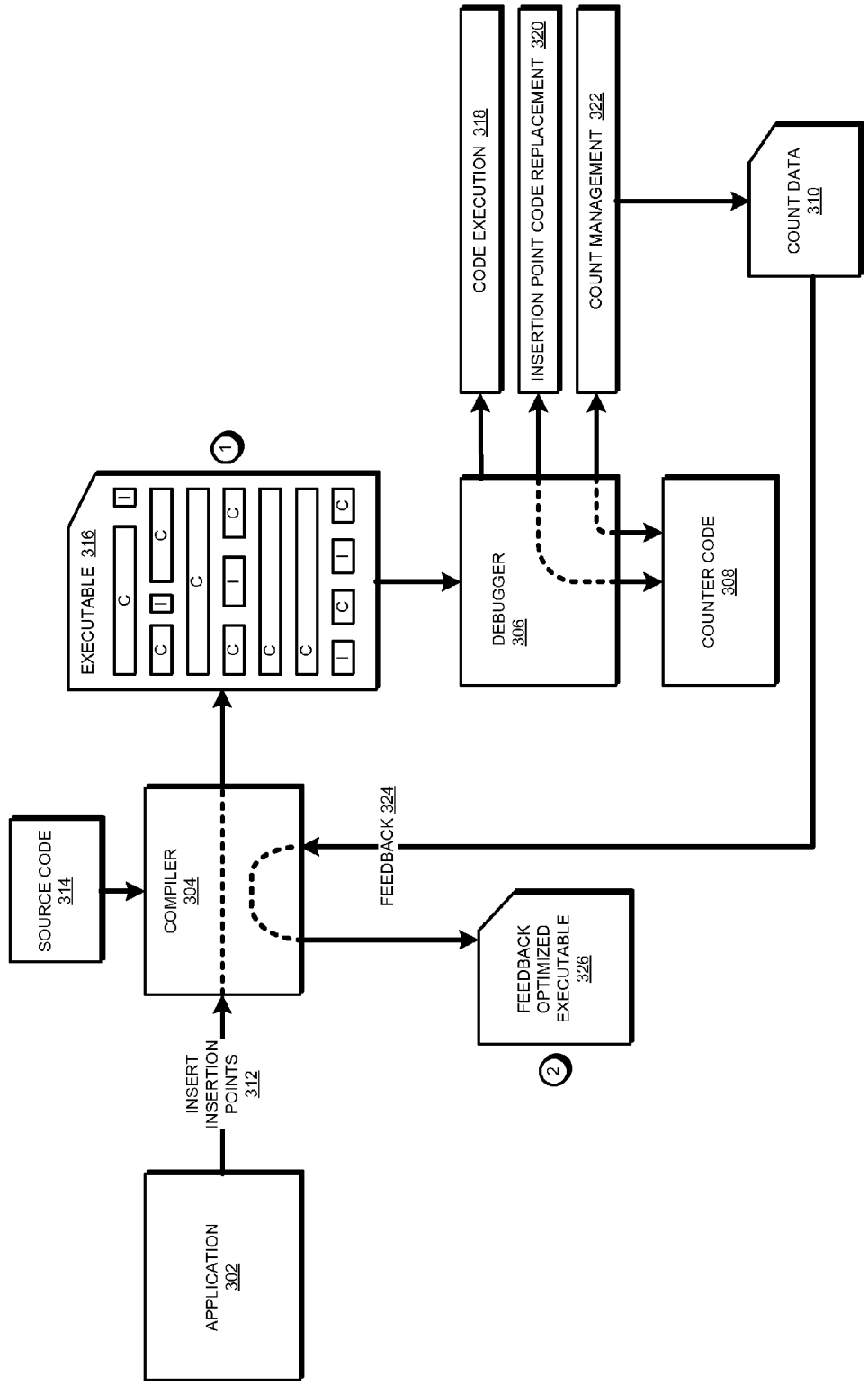
FIG. 3 depicts a block diagram of an example configuration for feedback directed compiling of optimized executable code in accordance with an illustrative embodiment.

With reference to FIG. 3, this figure depicts a block diagram of an example configuration for feedback directed compiling of optimized executable code in accordance with an illustrative embodiment. Application 302 is an example of application 105 in FIG. 1. Compiler 304 is an example of compiler 103 in FIG. 1. Debugger 306 is an example of debugger 107A, counter code 308 is an example of counter code 107B, and count data 310 is an example of count data 109 in FIG. 1.

Application 302 sends request 312 to compiler 304. Using request 312, compiler 304 compiles source code 314 to create executable 316. Executable 316 is labeled "1" to indicate that executable 316 is a first executable as described herein.

The blocks marked "C" represent executable instructions corresponding to source code 314, and the blocks marked "I" represent instructions corresponding to a signature of an insertion point that compiler 304 inserts in executable 316.

Debugger 306 receives executable 316. While executing executable 316, debugger 306 performs code execution 318 of a block marked "C", calls (320) counter code 308 instead of executing an instruction in a signature in a block marked "I", and performs count management 322 through the execution of counter code 308.

Executing executable 316 in this manner, debugger 306 and counter code 308 create count data 310. Count data 310 operates as feedback 324 to compiler 304.

Using feedback 324, compiler 304 creates executable 326. Executable 326 is labeled "2" to indicate that executable 326 is the second executable as described herein. Executable 326 is optimized using feedback 324, particularly to optimize a portion of executable 326 that is known to be hot according to count data 310.

Figure 4:
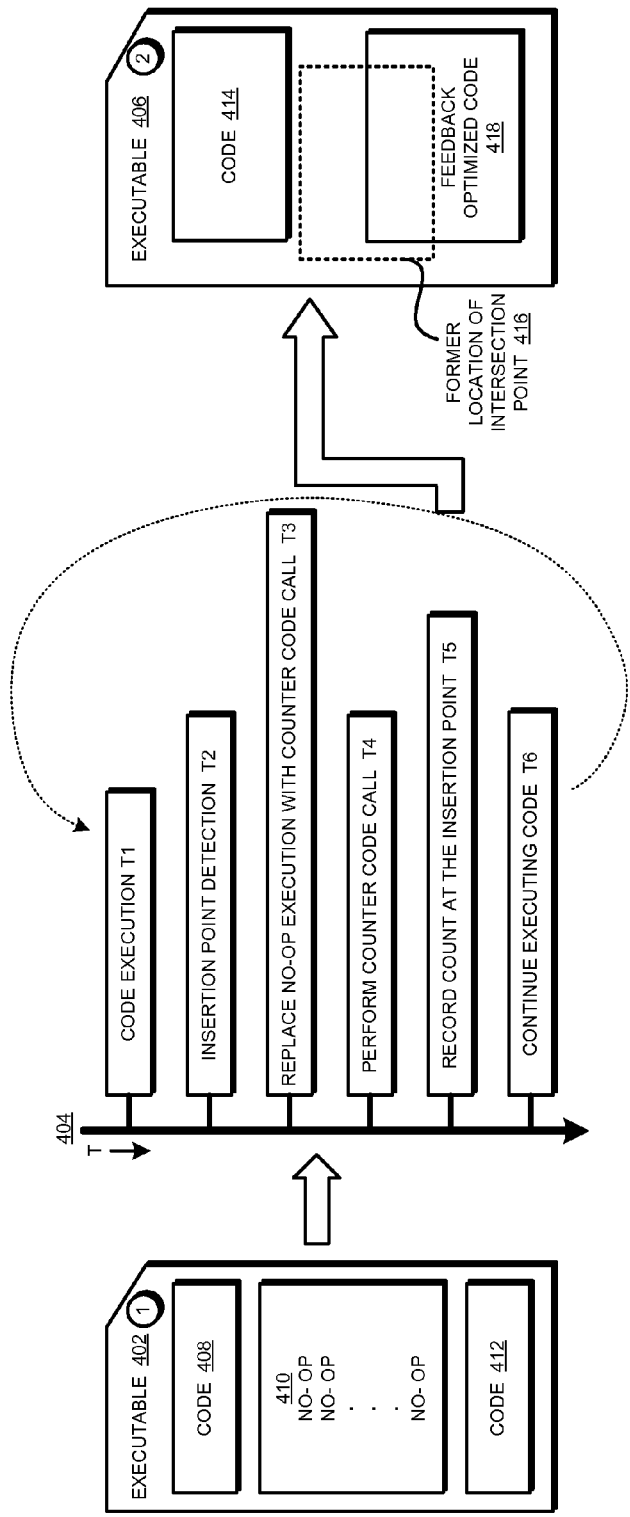
FIG. 4 depicts a block diagram of an example manner of constructing a second executable in accordance with an illustrative embodiment.

With reference to FIG. 4, this figure depicts a block diagram of an example manner of constructing a second executable in accordance with an illustrative embodiment. Executable 402, labeled "1" is a first executable similar to executable 316 in FIG. 3. Debugger 306 of FIG. 3 performs the operations along timeline 404. Executable 406, labeled "2" is a second executable similar to executable 326 in FIG. 3.

Assume, without implying any limitation on the illustrative embodiments, that in a particular implementation, the compiler, e.g., compiler 304 in FIG. 3, inserts an insertion point signature within a certain number of instructions before the instructions of executable code that the compiler self-determines to be hot. According to this example, executable 402 includes code portions 408 and 412 of which the compiler self-determines code portion to be a hot portion. Accordingly, the compiler inserts insertion point signature 410 before code 412. As a non-limiting example, signature 410 comprises n number of consecutive no-op instructions.

During execution of executable 402, a debugger executes code 408 at time T1. At time T2, the debugger detects insertion point signature 410. At time T3, the debugger replaces executing a no-op instruction from signature 410 with a call to a counter code, such as to counter code 308 in FIG. 3.

At time T4, the debugger performs the call to the counter code. At time T5, through the execution of the counter code, the debugger or the counter code records or increments a count in a counter corresponding to the insertion point of signature 410. At time T6 the debugger continues code execution by executing code portion 412. The operations along timeline 404 are repeated for any insertion point signature similar to signature 410 during the execution of executable 402.

The count collected at time T5 is included in code data 310 in FIG. 3. The compiler uses the count data to construct executable 406. Code portion 414 may be the same or different from code portion 408.

Suppose that the count for the insertion point corresponding to signature 410 exceeds a threshold. This means that code portion 412 is a hot portion. According to an embodiment, the compiler uses the count to optimize code 412 to result in code 418. Particularly, code portion 418 is optimized as a known hot portion.

In one embodiment, the compiler removes signature 410 from executable 406, which would have otherwise occupied position 416. In another embodiment, the compiler leaves signature 410 in place (not shown) before code portion 418.

With reference to FIG. 5, this figure depicts a flowchart of an example process for feedback directed compiling of optimized executable code in accordance with an illustrative embodiment. Process 500 can be implemented in application 302 in FIG. 3.

The application sends a request to a compiler to insert a set of insertion point signatures during the compilation of a given source code (block 502). The application causes the output of the compiler—the first executable with the set of insertion point signatures—to a debugger (block 504).

The application causes the debugger to recognize an insertion point by recognizing an insertion point signature in the executable during the execution of the first executable (block 506). The application causes the debugger to call a counter code instead of performing an instruction of the insertion point signature (block 508). Note that the instructions of the insertion point signatures are not limited to only no-op instructions but can be other instructions as well, chosen according to a preference of an implementation, and the same are contemplated within the scope of the illustrative embodiments.

The application causes the counter code call to result in updating a count in a counter, the counter corresponding to the insertion point (block 510). The application repeats blocks 506-510 each time the same insertion point or a different insertion point is reached in the first executable. The count data described herein is collected in this manner.

The application sends the count data, or causes the count data to be sent, to the compiler as feedback (block 512). The application sends a request, or otherwise causes the compiler, to recompile the source code into a second executable using the count data such that a portion of the second executable is optimized when a count corresponding to an insertion point at or relating to the portion exceeds a threshold (block 514). The application causes the compiler to output the second executable as the optimized executable (block 516). The application ends process 500 thereafter.

Thus, a computer implemented method, system or apparatus, and computer program product are provided in the illustrative embodiments for feedback directed compiling of optimized executable code. Where an embodiment or a portion thereof is described with respect to a type of device, the computer implemented method, system or apparatus, the computer program product, or a portion thereof, are adapted or configured for use with a suitable and comparable manifestation of that type of device. Where an embodiment is described as implemented in an application, the delivery of the application in a Software as a Service (SaaS) model is contemplated within the scope of the illustrative embodiments. In a SaaS model, the capability of the application implementing an embodiment is provided to the consumer by executing the application on a cloud infrastructure. The application is accessible from various client devices through a thin client interface such as a web browser (e.g., web-based e-mail). The user does not manage or control the underlying cloud infrastructure including network, servers, operating systems, storage, or even the capabilities of the application, with the possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

causing a compiler to self-determine a hot section in a source code during a first compilation of the source code;

sending a command to the compiler, the command causing the compiler to determine a set of insertion points corresponding to a set of hot sections in the source code, an insertion point in the set of insertion points corresponding to a determined hot section;

situating, during the first compilation of the source code into a first executable code, the insertion point corresponding to the hot section near a portion of the first executable code corresponding to the hot section;

inserting, during the first compilation of the source code, a set of signatures in the first executable code, wherein a signature in the set of signatures is located at the insertion point and comprises a combination of executable no-op instructions which when examined by a debugger inform the debugger that the signature has been inserted by the compiler and not a code in the source code to mark the insertion point, wherein a first signature in the set of signatures comprises a first sequence of only a first number of consecutive no-op instructions to cause a first operation at the debugger, and wherein a second signature in the set of signatures comprises a second sequence of only a second number of consecutive no-op instructions to cause a second operation at the debugger, wherein the correspondence between the first signature and the first operation and the correspondence between the second signature and the second operation are mutually agreed between the compiler and the debugger;

executing, during an execution of the first executable in a debugger using a processor and a memory, an instruction to call a counter code;

incrementing, responsive to the executing, a counter corresponding to the signature, wherein the counter code is configured to increment the counter in response to the instruction to call the counter code being executed from a location of the signature in the first executable code;

providing, to a compiler, a value of the counter corresponding to the location of the signature in the first executable code; and recompiling the source code to form a second executable code, the recompiling optimizing a portion of the second executable code responsive to the value exceeding a threshold, wherein the portion is related to the location of the signature in the first executable code.

2. The method of claim 1, further comprising: inserting the signature at the location in the first executable code, wherein the location is before a portion of executable code in the first executable code, and wherein the portion of executable code in the first executable code and the portion of executable code in the second executable code each perform the same function.

3. The method of claim 2, wherein the location is within a predetermined number of executable instructions before the portion of executable code in the first executable code, and wherein another executable instruction intervenes between the executable instructions of the signature and the executable instructions of the portion of the executable code in the first executable code.

4. The method of claim 1, further comprising: inserting the signature at the location in the first executable code, wherein the location is after a portion of executable code in the first executable code, and wherein the portion of executable code in the first executable code and the portion of executable code in the second executable code each perform the same function.

5. The method of claim 4, wherein the location is within a predetermined number of executable instructions after the portion of executable code in the first executable code, and wherein another executable instruction intervenes between the executable instructions of the signature and the executable instructions of the portion of the executable code in the first executable code.

6. The method of claim 1, further comprising: recognizing the signature during the execution of the first executable code in the debugger.

7. The method of claim 1, further comprising: configuring a set of counters corresponding to the set of signatures.

8. The method of claim 1, further comprising: constructing the combination of executable instructions of the signature such that the combination is distinct from any other combination of instructions resulting from converting the source code into executable instructions.

9. The method of claim 8, wherein the combination of executable instructions of the signature comprise consecutive no-op instructions.

10. The method of claim 9, wherein the consecutive no-op instructions include at least three consecutive no-op instructions.

11. The method of claim 10, wherein the combination of executable instructions of the signature further include an instruction to perform a computation.

12. The method of claim 8, further comprising: constructing a second combination of executable instructions for a second signature, wherein the second combination of executable instructions for the second signature is distinct from the combination of executable instructions for the signature.

13. The method of claim 8, further comprising: constructing a second combination of executable instructions for a second signature, wherein the second combination of executable instructions for the second signature is identical to the combination of executable instructions for the signature.

14. The method of claim 1, wherein the method is embodied in a computer program product comprising one or more computer-readable storage devices and computer-readable program instructions which are stored on the one or more computer-readable storage devices and executed by one or more processors.

15. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

16. The method of claim 1, wherein the first operation comprises a first manner of incrementing a first counter, and the second operation comprises a second manner of incrementing a second counter.

17. A computer program product comprising one or more computer-readable storage devices, and program instructions stored on at least one of the one or more storage devices, the stored program instructions comprising:

program instructions to cause a compiler to self-determine a hot section in a source code during a first compilation of the source code;

program instructions to send a command to the compiler, the command causing the compiler to determine a set of insertion points corresponding to a set of hot sections in the source code, an insertion point in the set of insertion points corresponding to a determined hot section;

program instructions to situate, during the first compilation of the source code into a first executable code, the insertion point corresponding to the hot section near a portion of the first executable code corresponding to the hot section;

program instructions to insert, during the first compilation of the source code, a set of signatures in the first executable code, wherein a signature in the set of signatures is located at the insertion point and comprises a combination of executable no-op instructions which when examined by a debugger inform the debugger that the signature has been inserted by the compiler and not a code in the source code to mark the insertion point, wherein a first signature in the set of signatures comprises a first sequence of only a first number of consecutive no-op instructions to cause a first operation at the debugger, and wherein a second signature in the set of signatures comprises a second sequence of only a second number of consecutive no-op instructions to cause a second operation at the debugger, wherein the correspondence between the first signature and the first operation and the correspondence between the second signature and the second operation are mutually agreed between the compiler and the debugger;

program instructions to execute, during an execution of the first executable in a debugger using a processor and a memory, an instruction to call a counter code;

program instructions to increment, responsive to the executing, a counter corresponding to the signature, wherein the counter code is configured to increment the counter in response to the instruction to call the counter code being executed from a location of the signature in the first executable code;

program instructions to provide, to a compiler, a value of the counter corresponding to the location of the signature in the first executable code; and program instructions to recompile the source code to form a second executable code, the recompiling optimizing a portion of the second executable code responsive to the value exceeding a threshold, wherein the portion is related to the location of the signature in the first executable code.

18. The computer program product of claim 17, the stored program instructions further comprising: program instructions to insert the signature at the location in the first executable code, wherein the location is before a portion of executable code in the first executable code, and wherein the portion of executable code in the first executable code and the portion of executable code in the second executable code each perform the same function.

19. The computer program product of claim 18, wherein the location is within a predetermined number of executable instructions before the portion of executable code in the first executable code, and wherein another executable instruction intervenes between the executable instructions of the signature and the executable instructions of the portion of the executable code in the first executable code.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to cause a compiler to self-determine a hot section in a source code during a first compilation of the source code;

program instructions to send a command to the compiler, the command causing the compiler to determine a set of insertion points corresponding to a set of hot sections in the source code, an insertion point in the set of insertion points corresponding to a determined hot section;

program instructions to situate, during the first compilation of the source code into a first executable code, the insertion point corresponding to the hot section near a portion of the first executable code corresponding to the hot section;

program instructions to insert, during the first compilation of the source code, a set of signatures in the first executable code, wherein a signature in the set of signatures is located at the insertion point and comprises a combination of executable no-op instructions which when examined by a debugger inform the debugger that the signature has been inserted by the compiler and not a code in the source code to mark the insertion point, wherein a first signature in the set of signatures comprises a first sequence of only a first number of consecutive no-op instructions to cause a first operation at the debugger, and wherein a second signature in the set of signatures comprises a second sequence of only a second number of consecutive no-op instructions to cause a second operation at the debugger, wherein the correspondence between the first signature and the first operation and the correspondence between the second signature and the second operation are mutually agreed between the compiler and the debugger;

program instructions to execute, during an execution of the first executable in a debugger using a processor and a memory, an instruction to call a counter code;

program instructions to increment, responsive to the executing, a counter corresponding to the signature, wherein the counter code is configured to increment the counter in response to the instruction to call the counter code being executed from a location of the signature in the first executable code;

program instructions to provide, to a compiler, a value of the counter corresponding to the location of the signature in the first executable code; and program instructions to recompile the source code to form a second executable code, the recompiling optimizing a portion of the second executable code responsive to the value exceeding a threshold, wherein the portion is related to the location of the signature in the first executable code.

* * * * *